May 6, 1958  D. M. SCHWARTZ  2,833,361
VEHICLE AND FRAME STRUCTURE THEREFOR
Filed April 1, 1955  6 Sheets-Sheet 2

INVENTOR
DANIEL M. SCHWARTZ

BY Harold T. Stowell
ATTORNEY

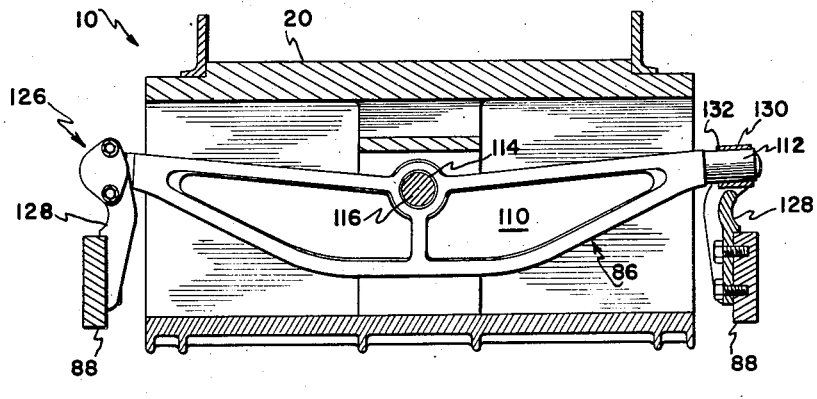
FIG. 5
FIG. 6
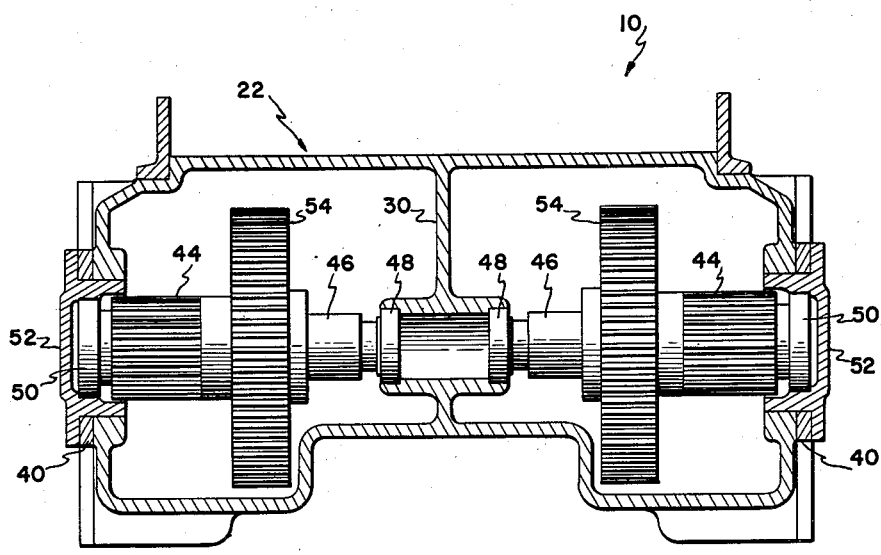

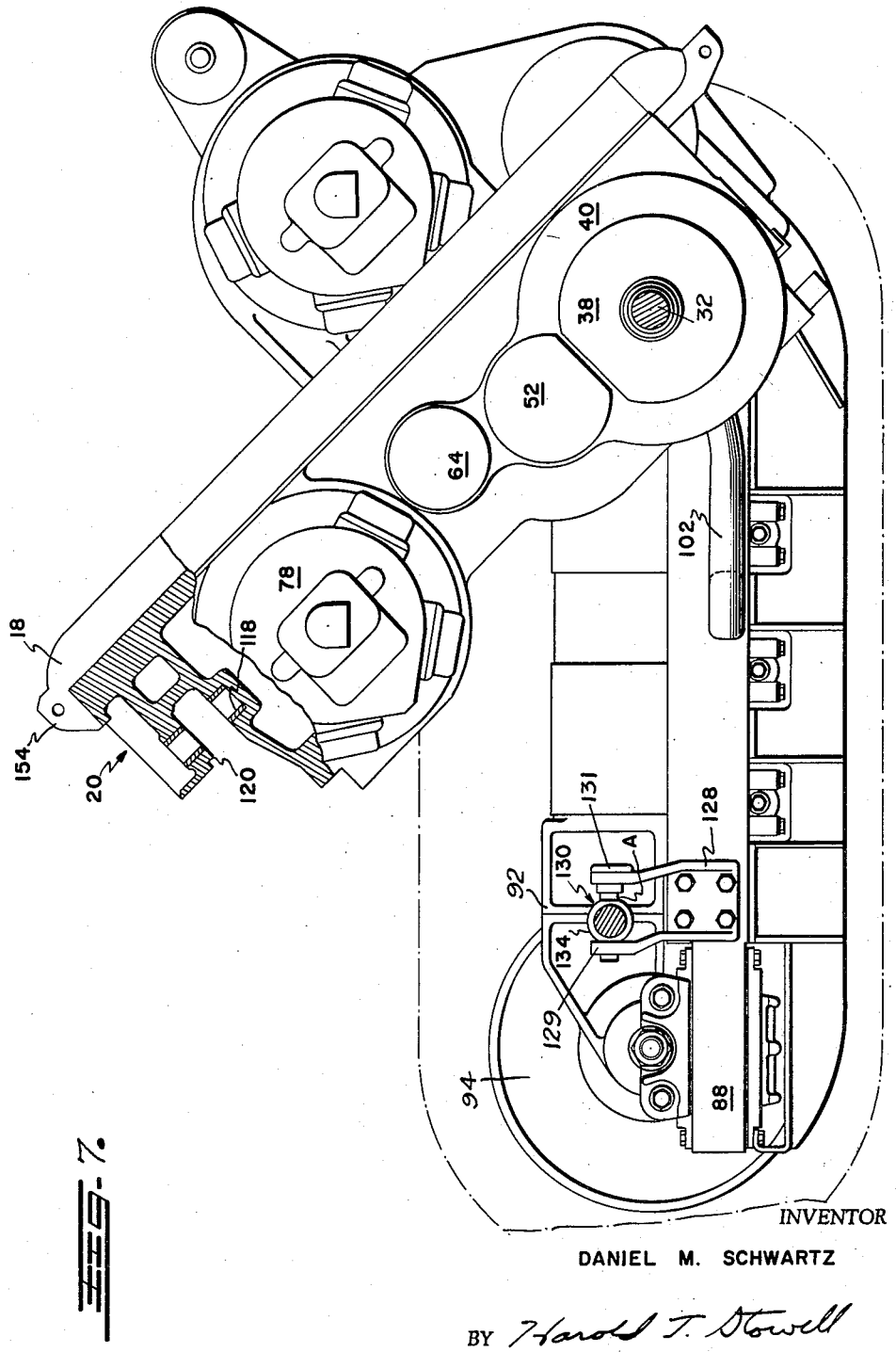

United States Patent Office 2,833,361
Patented May 6, 1958

2,833,361

VEHICLE AND FRAME STRUCTURE THEREFOR

Daniel M. Schwartz, Salt Lake City, Utah, assignor, by mesne assignments, to The Eimco Corporation, Salt Lake City, Utah, a corporation of Delaware Application April 1, 1955, Serial No. 498,505

6 Claims. (Cl. 180—6.48)

This invention relates to a land vehicle and more particularly and specifically to a material handling machine provided with paired lateral ground engaging units, and to an improved frame structure therefor.

It is a principal object of the present invention to provide an improved vehicle of the type described having a unitary frame structure of rugged construction adapted to house paired transmission units for opposed lateral ground engaging units, paired motors for independently driving the transmissions, and to provide the load and thrust carrying means for various material handling structures such as overhead rockers units, bulldozer units, pivotal bucket units and the like.

It is a further object to provide such a vehicle wherein the paired lateral crawler units are mounted for independent pivotal movement relative to the frame structure and attached material handling device.

A further object is to provide such a machine wherein the main frame and attached material handling device may be pivoted upwardly and backwardly about the paired lateral crawler units whereby repairs, replacements and adjustments may be readily made in the motors and the transmissions.

Further objects and advantages are to provide such a machine that is rugged in construction, relatively simple as to its parts, and very adaptable to many and varied working conditions.

These and other objects and advantages of the invention are provided in a vehicle having a body portion and a ground engaging portion, the body portion comprising paired opposed transmissions including a laterally extending live axle journalled in each of the transmissions, paired opposed motors carried at the forward ends of the transmissions, means drivably connecting a motor and a transmission whereby each of the live axles is independently driven, the ground engaging portions include paired lateral crawler frames carrying endless belt type crawler chains, means pivotally connecting one end of each of the crawler frames to one of the live axles and means drivably connecting the crawler chain thereto, and releasable means pivotally connecting the other end of the crawler frames to the body portion forwardly of the motors; and a frame means for a vehicle having independent drives for paired traction units which generally comprises a substantially H-shaped casting, a pair of live axles journalled in one of the legs of the H-shaped casting and extending outwardly in opposite directions therefrom, paired lateral crawler frames carrying endless belt type crawler chains, means pivotally connecting one end of each of the crawler frames to one of the live axles and means drivably connecting the crawler chain thereto and releasable means pivotally connecting the other end of the crawler frames to the other of the legs of the H-shaped casting.

These and other objects and advantages of the invention will appear more clearly from the detailed description in connection with the illustrative embodiments of the invention shown in the accompanying drawings in which:

Fig. 5 is a section substantially on line 7—7 of Fig. 3;

Fig. 6 is a section substantially on line 8—8 of Fig. 3; and

Fig. 7 is an enlarged fragmentary side elevational view in partial section of the machine shown in Fig. 1 with the frame portion pivoted about the ground engaging crawler units.

Figure 1:
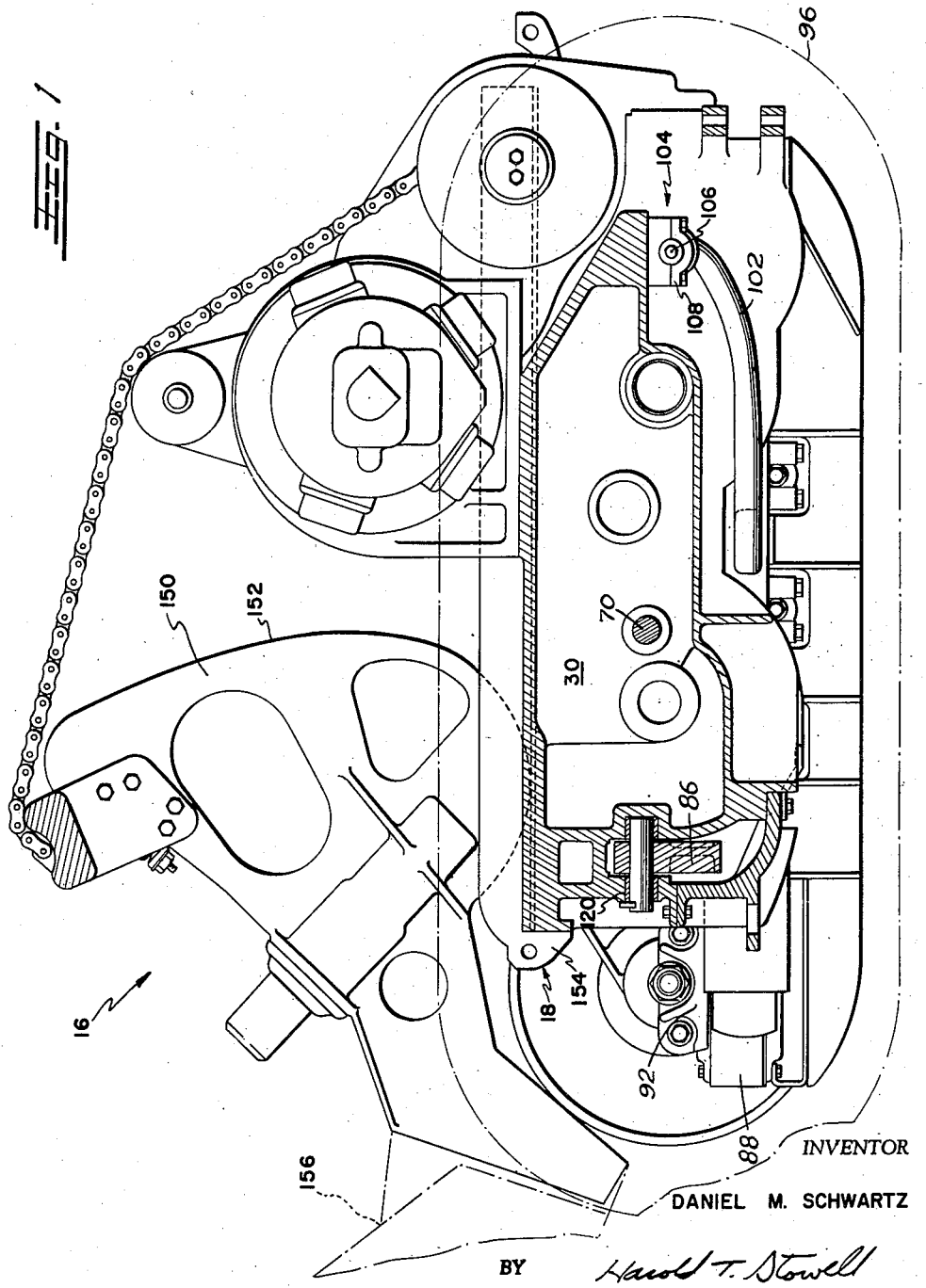
Fig. 1 is an enlarged fragmentary side elevation in partial section.
Figure 2:
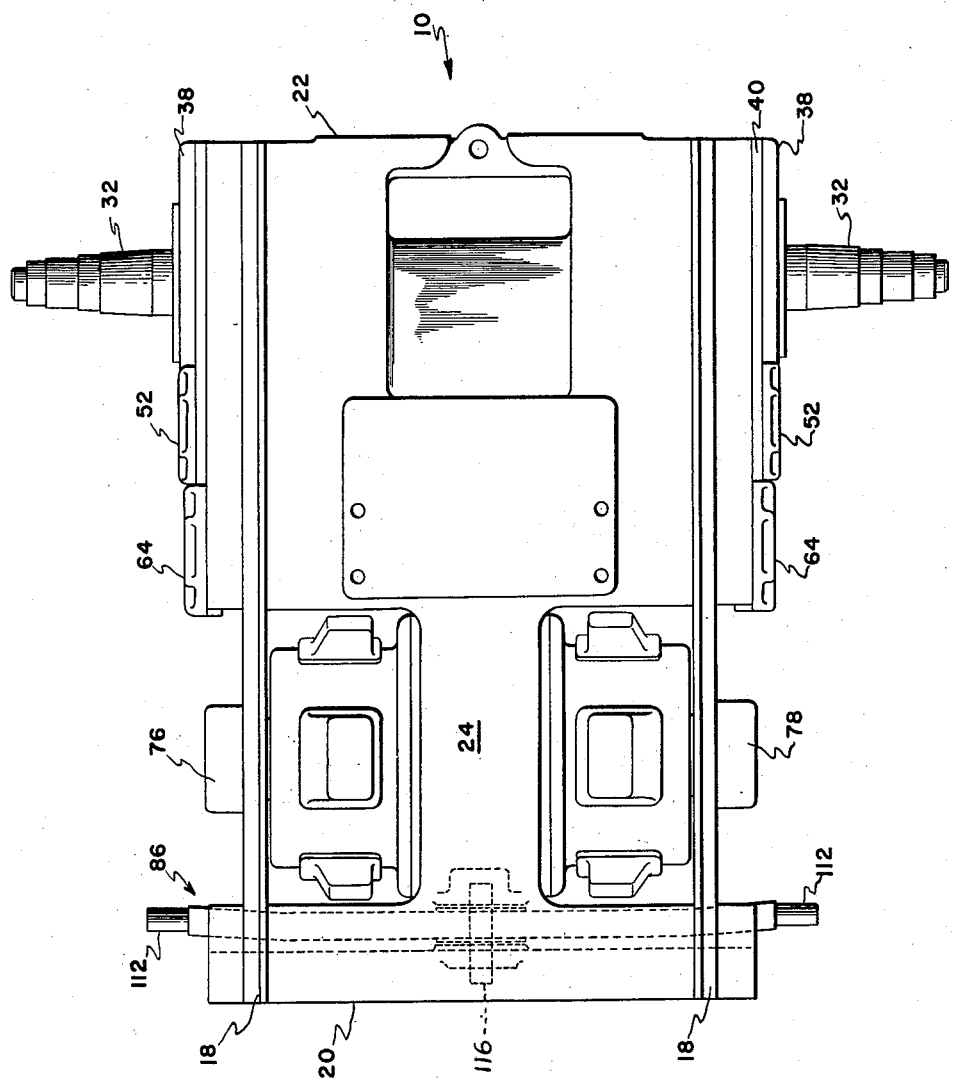
Fig. 2 is a top plan view of the frame of the machine shown in Fig. 1 including the front equalizer bar, the paired traction motors and rails for the overhead material handling structure.

Referring to the drawings there is shown a material handling apparatus embodying the principles of the invention which generally comprises a main frame or body 10 pivotally mounted on individually operated crawler or endless track units 12 and 14. The main frame 10 supports an overhead bucket assembly generally designated 16 upon parallel tracks or rails 18 to be more fully described hereinafter.

Referring particularly to Figs. 1 through 3, 5 and 6 the main frame 10 of the machine generally comprises a unitary casting having a substantially H-shape when viewed in plan, including leg portions 20 and 22 and bridge portion 24. The upper and lower surfaces of leg portion 22 and bridge portion 24 define an interior chamber adapted to receive dual transmissions 26 and 28. The chamber within the casting comprising the main frame is provided with a web portion 30 more clearly shown in Figs. 3 and 6 which longitudinally divides the chamber into two substantially equal portions.

The web portion 30, as to be more fully described, provides bearing supports for the inboard portions of each of the elements of the transmissions 26 and 28.

Each of the transmissions 26 and 28 is identical and corresponding elements in each transmission will be given the same reference numeral. The transmissions include live axles 32 rotatable supported by inboard bearings 34 and outboard bearings 36. The inboard bearings 34 are supported in a portion of the web member 30 while the outboard bearings are carried by bearing support plates 38 bolted to the large cover plates 40. A gear 42 secured to each live axle 32 meshes with a gear 44 secured to each intermediate shaft 46, which shafts are rotatably carried in inboard bearing means 48 and outboard bearing means 50. The inboard bearing means 48 are supported in web member 30 while the outboard bearing means 50 are supported in bearing cover plates 52 secured to the large cover plates 40. Each intermediate shaft 46 also carries a gear 54 which meshes with a gear 56 secured to each second intermediate shaft 58. The second intermediate shafts are rotatably supported in inboard bearing means 60 carried by web portion 30 and outboard bearing means 62 supported in bearing cover plates 64 bolted about bores in the casting comprising the main frame 10.

Each second intermediate shaft 58 also has secured thereto a gear 66 which meshes with an idler gear 68 supported on each stub shaft 70 carried by the web member 30. Each idler gear 68 meshes with a gear 72 secured to each motor pinion shaft 74 of air motors 76 and 78 secured to the bridge portion of the H-shaped casting between the leg portions 20 and 22. The motor pinion shafts 74 are rotatably supported in inboard bearing means 80 and outboard bearing means 82. The inboard bearing means 80 are carried by the web portion 30 while the outboard bearing means 82 are carried by motor cover plates 84.

The most lateral extent of the air motors 76 and 78 is substantially equal to the greatest lateral extent of the leg portions 20 and 22 so that the crawler frames are free to pivot up and down as will be apparent from the following description.

The endless track unit 12 and 14 generally includes track or swing frames connected to the material handling machine adjacent the rear end, and which are also pivotally connected to a transverse equalizer bar 86 pivotally connected to the leg portion 20 of the H-shaped casting.

Figure 3:
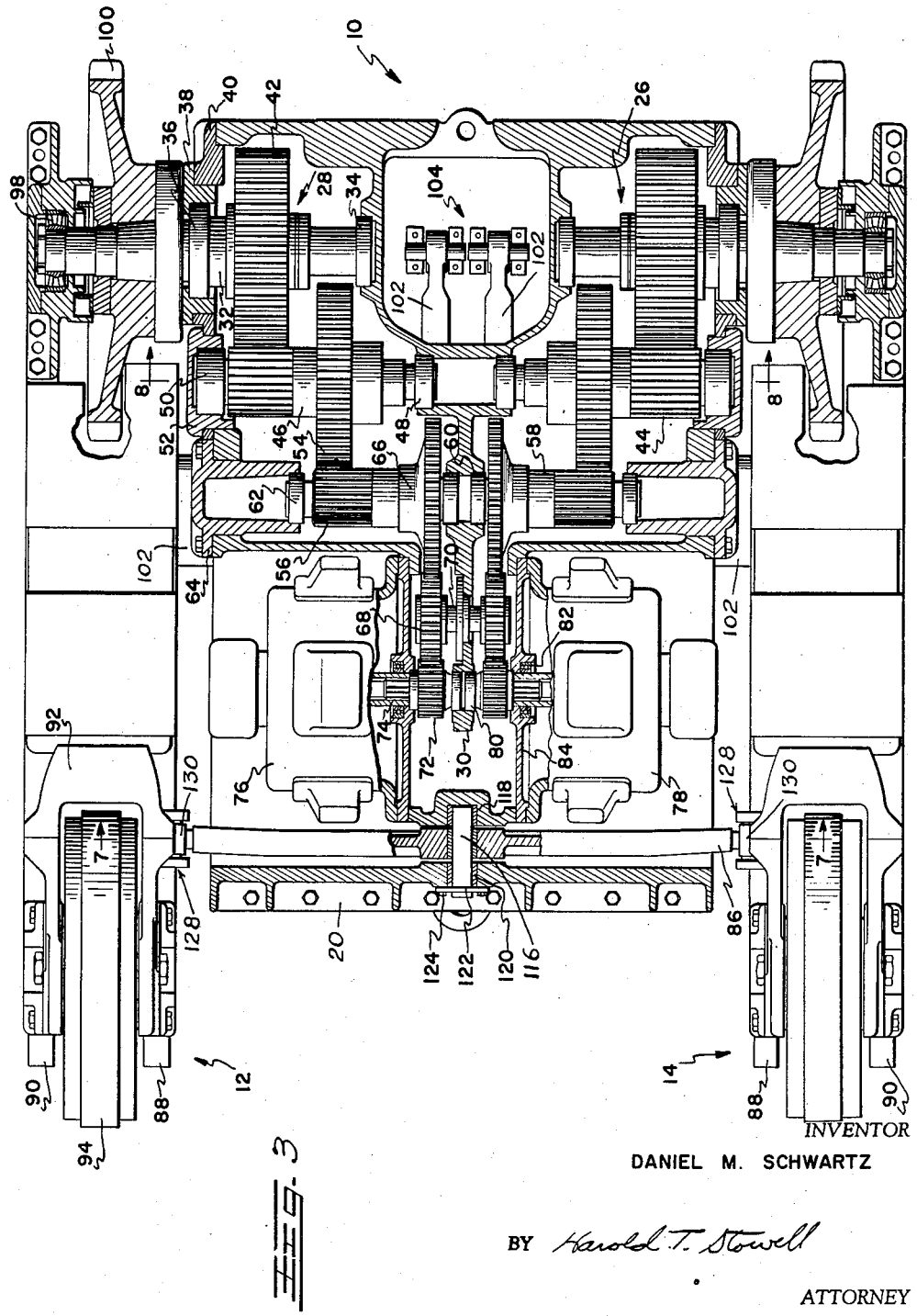
Fig. 3 is an enlarged fragmentary view in partial section through the cast frame of the machine.

With particular reference to Fig. 3, each of the track frames comprises a pair of spaced channel members 88 and 90 connected together by transverse rib members and plates as is well known in the art. At the forward end of each track frame is slidably carried a substantially U-shaped member 92 rotatably supporting the front idler wheels 94 to provide track tensioning for the endless chain crawler tracks 96.

The outer side channel members 90 are of greater length than the corresponding inner channel members 88 and secured to the rearward extension of the outboard channel members are self-aligning roller bearing units 98. The inner bearing of each self-aligning roller bearing unit 98 is carried by the live axle shaft 32 of each drive unit 26 and 28 whereby each crawler frame may be pivoted about its live axle shaft. Between the self-aligning bearing units 98 and the live axle outboard bearings 36 of each unit is secured a sprocket wheel 100, the teeth of which engage its endless crawler chain 96 in the well known manner.

Each track frame unit is provided with a generally rearwardly extending diagonal brace member 102. The forward and large ends of the braces 102 are secured, preferably by welding to the inner track channel members 88 (Fig. 4) forwardly of the bearing members 98 on the complementary outer channel members. The rearward ends of the diagonal braces 102 are each pivotally connected to the underside of leg 22 of the main casting of the machine concentric with the axis of rotation of the live axles 32 whereby the track frames are free to pivot thereabout with the outboard ends of live axles 32 forming one of the pivot points and bearings 104 on center with the axles 32, forming the other pivot points.

Figure 4:
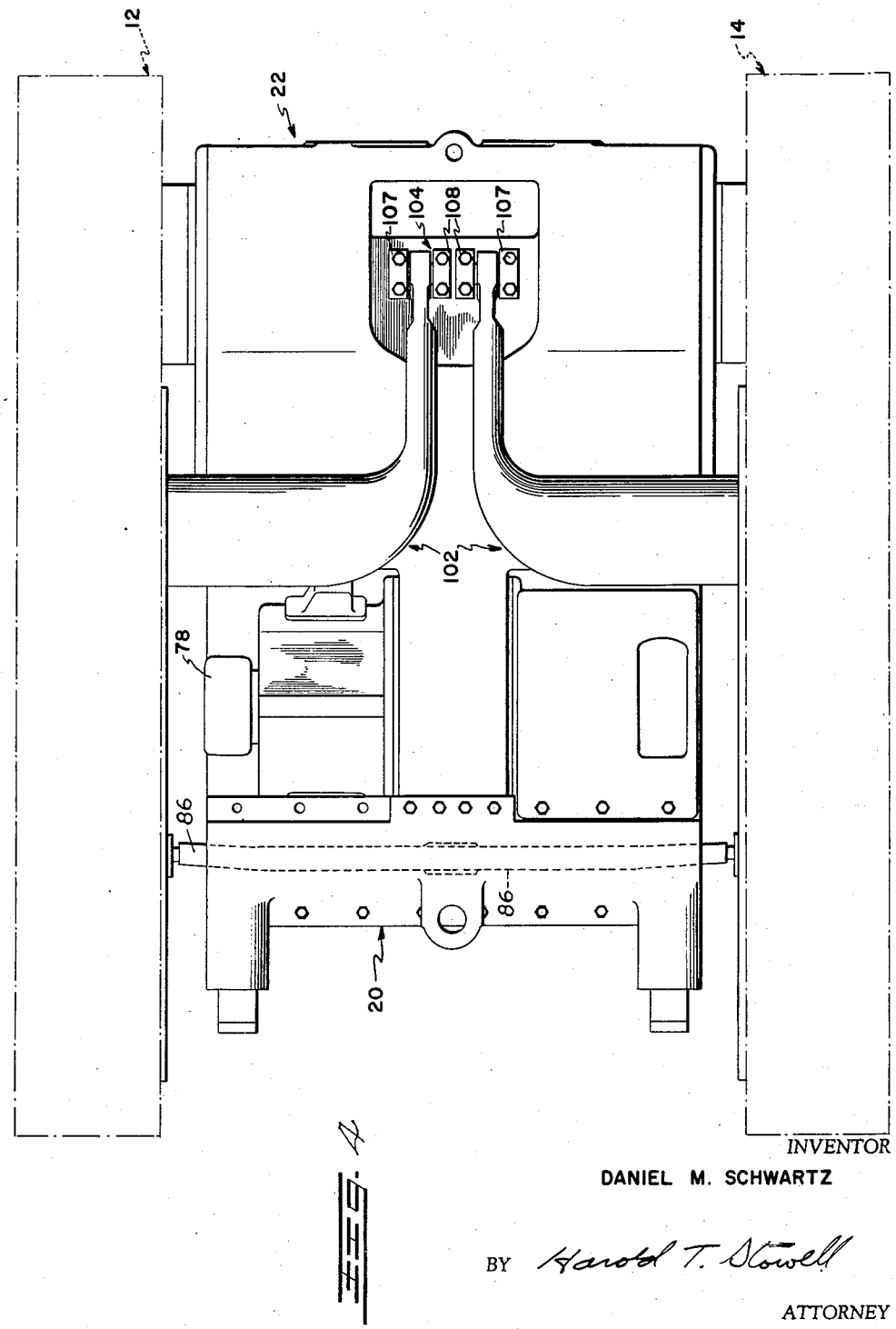
Fig. 4 is a bottom plan view of the machine shown in Fig. 1.

The bearings 104, as more clearly shown in Figs. 1 and 4, generally comprise a pivot pin 106 which is supported at its ends by clamping brackets 107 and by inner clamping brackets 108 with the space provided between the corresponding pairs of inner and outer brackets slightly greater than the width of the diagonal braces at their rearward ends to provide "bearing clearance."

The forward support means for the paired lateral crawler frames will be described with particular reference to Figs 3, 5 and 7. The equalizer bar 86 has four primary functions:

Firstly, the weight of the forward and of the main frame and its attached structures is transmitted to the ground engaging crawler units through the bar;

Secondly, it transmits the substantial downward digging force from the main frame to the track frames;

Thirdly, it permits relative pivotal movement between the crawler units and the main frame; and Fourthly, it provides means whereby the weight of the main frame and the weight of the crawler units are all effective to reduce the tendency of the machine to overturn when it is utilized as an overhead material handling machine. These four functions of the equalizer bar will become apparent from the following detailed description.

The equalizer bar 86 comprises a rigid cast member having a center section 110 and end portions 112 having circular cross sections.

The equalizer bar 86 is provided with a central bore 114 adapted to receive a removable pivot pin 116. The removable pivot pin 116 is supported at its inner and outer ends in bores 118 and 120 in the forward leg portion 20 of the substantially H-shaped casting comprising the main frame of the machine. A flange 122, Fig. 3 of the drawings, is bored to receive bolts 124 for releasably securing the pivot pin 116 to the forward or leading edge of the leg portion 20.

The pivot pin 116 permits the ends of the equalizer bar 86 to pivot upwardly and downwardly as the material handling machine traverses uneven ground so that the individual crawler units are free to pivot vertically with respect to the main casting or frame of the machine. The releasable pivot pin 116 also permits the main frame 10 and structures carried thereby to be pivoted upwardly about the axis of the live axles 32 as shown in Fig. 7 whereby the individual transmissions 26 and 28 and the individual crawler motors 76 and 78 may be conveniently removed or repaired without removing the crawler units thereby substantially reducing the "downtime" of the machine.

The outer circular ends 112 of the equalizer bar are pivotally and slidably secured in bearings generally designated 126 which bearings are fastened to their respective inboard channel members 88 by means of bifurcated members 128. The bifurcated members 128 are secured at their lower ends by bolts to the inboard channel members 88 while the upper ends project above said channel members and are provided with bores adapted to receive the ends of a trunnion bearing 130. The center portion of the trunnion bearing 130 is radially bored as at 132 to receive the circular ends of the equalizer bar. The width of the center portion 134 of each trunnion bearing 130, and the distance between the bifurcated ends of the support member 128 are selected to provide limited axial sliding movement for the trunnion bearing in addition to its normal pivotal movement in the bifurcated support. The space provided for this sliding movement is designated A in Fig. 7 of the drawings.

In the operation of the suspension system as the material handling machine traverses uneven ground, the individual crawler units are free to pivot vertically with respect to the H-shaped casting. The pivotal axis as hereinbefore described, is the axis of the live axles 32. As the crawler units pivot up or down, the equalizer bar 86 also pivots about the releasable pivot pin 116, and the following motions take place between the end of the equalizer bar on, for example, the high side; the distance between the center of the trunnion bearing 130 and the center of the equalizer bar increases and the end of the equalizer bar withdraws slightly from the bore 132 in the trunnion bearing 130; the angular relationship between the crawler units and the equalizer bar changes and the end of the equalizer bar rotates in the bore 132 while the trunnion bearing 130 rotates in the bearings 129 and 131 in the bifurcated support member 128; and the trunnion bearing 130 shifts slightly laterally relative to the bearings in said bifurcated member.

In the form of the invention shown in the drawings the material handling superstructure 16 is of the overhead rocker type. The side frames 150 of the rocker structure have curved surfaces 152 for rolling engagement with the parallel rails 18, the radius of curvature of the surfaces 152 gradually increasing from the forward to the rearward ends of the curved sections. The rail members 18 upon which the rocker structures 150 roll are supported between the ends of the leg portions 20 and 22 of the H-shaped casting and are provided at their forward ends with thrust pivots 154. Between the lower ends of the curved rocker arms is supported a material handling device in the form of a shovel bucket 156. Certain of the subject matter of this application is disclosed in my copending application Serial No. 361,601, filed June 15, 1953, now Patent No. 2,792,140.

I claim:
1. A mobile material handling vehicle comprising a body, ground-engaging means and drive means for propelling the vehicle, said body including a rear transverse portion, and a relatively narrow portion extending centrally and forwardly from the rear transverse portion, said ground-engaging means including paired frames carrying traction elements disposed along each side of the body, means pivotally connecting the paired frames to the body adjacent the rearward end thereof to swing about the body, said drive means including a pair of motors, means mounting said motors on opposite sides of said centrally extending portion of the body to dispose the motors between said centrally extending portion and said frames of the ground-engaging means and means drivably connecting the motors to the traction elements, and releasable support means connecting the forward end of said body and said frames of the ground-engaging means whereby upon release of said releasable means the body may be pivoted upwardly and rearwardly about the axes of said pivotal connections between the frames of the ground-engaging means and the body of the vehicle to position the motors above the frames of the ground-engaging means.

2. A mobile material handling vehicle comprising a body, ground-engaging means and drive means for propelling the vehicle, said body including a rear transverse portion, and a relatively narrow portion extending centrally and forwardly from the rear transverse portion, laterally extending axles carried by the transverse portion of the body, said ground-engaging means including paired frames carrying traction elements disposed along each side of the body, means pivotally mounting the paired frames on said laterally extending axles to swing about the axes of said laterally extending axles, said drive means including a pair of motors, means mounting said motors on opposite sides of said centrally extending portion to disposed the motors between said centrally extending portion and said frames of the ground-engaging means and means drivably connecting the motors to the traction elements, a transversely extending member connecting the forward ends of said frames carrying the traction elements and releasable means connecting said transversely extending member to the centrally extending portion of the body whereby upon release of said releasable means the body may be pivoted upwardly and rearwardly about the axes of said laterally extending axles to position the motors above the frames of the ground-engaging means.

3. A mobile material handling vehicle comprising a body, ground-engaging means and drive means for propelling the vehicle, said body including a rear transverse portion, and a relatively narrow portion extending centrally and forwardly from the rear transverse portion, laterally extending axles carried by the transverse portion of the body, said ground-engaging means including paired frames carrying traction elements disposed along each side of the body, means pivotally mounting the paired frames on the laterally extending axles to swing about the axes of said laterally extending axles, said drive means including a pair of motors, means mounting said motors on opposite sides of said centrally extending portion to dispose the motors between said centrally extending portion and said frames of the ground-engaging means and means drivably connecting the motors to the traction elements, a transverse equalizer bar connecting the forward ends of said frames carrying the traction elements and a pivot pin extending through a bore in the equalizer bar, means releasably securing the pivot pin to the centrally extending portion of the body whereby upon removal of the pivot pin from the bore in the equalizer bar the body may be pivoted upwardly and rearwardly about the axes of said laterally extending axles to position the motors above the frames of the ground-engaging means.

4. The invention defined in claim 2 wherein the greatest lateral extent of said motors mounted on opposite sides of centrally extending portion of the body and the extended ends of the rear transverse portion of the body is substantially equal.

5. A mobile material handling vehicle comprising a body, ground-engaging means, and drive means for propelling the vehicle, said body including a rear transverse portion, a front transverse portion, and a relatively narrow portion extending centrally between said front and rear transverse portions, laterally extending axles carried by the rear transverse portion of the body, said ground-engaging means including paired frames carrying traction elements disposed along each side of the body, means pivotally mounting the paired frames on the laterally extending axles to swing about the axes of said laterally extending axles, said drive means including a pair of motors, means mounting said motors on opposite sides of said centrally extending portion to dispose the motors between said centrally extending portion and said frames of the ground-engaging means and means drivably connecting the motors to the traction elements, a transversely extending member connecting the forward ends of said frames carrying the traction elements and releasable means connecting said transversely extending member to the forward transverse portion of the body whereby upon release of said releasable means the body may be pivoted upwardly and rearwardly about the axes of said laterally extending axles to position the motors above the frames of the ground-engaging means.

6. The invention defined in claim 5 including rail members extending between the forward and rearward transverse portions of the frame, said rail members adapted to provide rolling surfaces for a material handling superstructure.

References Cited in the file of this patent

UNITED STATES PATENTS

| | | |
|---|---|---|
| 502,577 | Newman | Aug. 1, 1893 |
| 1,435,910 | Bailard | Nov. 21, 1922 |
| 1,920,661 | Osman | Aug. 1, 1933 |
| 2,063,035 | Fuller et al. | Dec. 8, 1936 |
| 2,378,942 | Norelius | June 26, 1945 |
| 2,589,043 | Brewen | Mar. 11, 1952 |
| 2,690,848 | Beyerstedt | Oct. 5, 1954 |

FOREIGN PATENTS

| | | |
|---|---|---|
| 505,698 | France | May 14, 1920 |
| 667,294 | Great Britain | Feb. 27, 1952 |
| 1,087,568 | France | Aug. 25, 1954 |